April 15, 1958 P. F. M. GLOESS 2,830,758

BINARY TO DECIMAL CONVERSION SYSTEM

Filed July 17, 1952 3 Sheets-Sheet 1

INVENTOR.
PAUL FRANCOIS MARIE GLOESS

BY Theodore Hafner

ATTORNEY

BINARY TO DECIMAL CONVERSION SYSTEM

Filed July 17, 1952

INVENTOR.
PAUL FRANCOIS MARIE GLOESS
BY Theodore Hafner
ATTORNEY

April 15, 1958 P. F. M. GLOESS 2,830,758

BINARY TO DECIMAL CONVERSION SYSTEM

Filed July 17, 1952 3 Sheets-Sheet 3

INVENTOR.
PAUL FRANCOIS MARIE GLOESS

BY Theodore Hafner

ATTORNEY 2,830,758

BINARY TO DECIMAL CONVERSION SYSTEM

Paul François Marie Gloess, Paris, France, assignor to Societe d'Electronique et d'Automatisme, Courbevoie, Seine, France Application July 17, 1952, Serial No. 299,351

Claims priority, application France July 23, 1951

31 Claims. (Cl. 235—61)

The present invention concerns devices for analyzing coded electric pulse trains representing numbers written in the well known system of binary numeration with a numeration basis equal to 2. This analysis is achieved in such a manner as to derive the figures of these same numbers in a numeration system of a basis higher than 2, more particularly in decimal numeration with a basis equal to 10.

It is current practice electrically to represent a number expressed in binary numeration in the form of a pulse train in which at time consecutive moments the binary figures 1 and 0 of the normal writing of such numbers, are represented by presence and absence of concrete pulses. Such a code train frequently is transmitted with its code moments or pulse periods arranged in time in the sense of increasing orders or weights of the binary terms. This involves reading the binary system starting with the figure of units.

In electric calculator systems, it is advisable to execute the desired operations by means of such code trains of numerical pulses; the result of calculation will then represent itself in the form of a pulse train with a maximum number of rhythmed code moments.

In the following $\theta$ will designate the duration of a code moment; $T=N\theta$, the duration of a coded result train with N code moments; N defines the numerical output capacity of the calculator where at the utmost only coded pulse trains representing the numbers $2^N-1$ can be delivered. The time interval T is ordinarily designated as minor cycle of the calculation program, and there is provided in the system a pulse generator of frequency T. There also is provided a recurrent sequence of pulses of frequency $\theta$. Such sequence is generally furnished by a pulse distributor receiving at its input the pulses of frequency T and transmitting them at least at N output terminals with N time displace- 0, $\theta$, $2\theta$, . . . $N\theta$. Such a pulse distributor frequently consists of an artificial delay line with $N-1$ sections of individual delay $\theta$. In these sections, if desired, intermediate taps can be established to take off pulses of intervals of less than $\theta$. Such a pulse distributor will be designated in the following as primary line. Each output tap can be multipled over several conductors and, by means of resistance mixers, any one of the numerical codes from 0 to $2^N-1$ can be derived in binary numeration to be utilized in the calculator.

In these systems, frequently, the numerical capacity is reduced to $2^{N-1}-1$. This is due to the fact that the first code moment of each minor cycle is reserved to indicate the algebraic sign (+) or (−) of a number. For example, the existence of a concrete pulse in that first code moment indicates a negative result sign (−), while absence of pulse at that code moment indicates a positive result sign (+).

Since the first significant binary figure of the modul of the number is of weight 2 in the representation of the coded train, it is conventional to write the expression for the admissible value of the modul of the maximum number in the form: $2\,(2^{N-1}-1)$. This value is divisible by 2 without loss in precision.

It should also be noted that multiplication by 2 or any multiple of 2 included in the series of binary numbers 2, 4, 8, . . . $2^n$, . . . of a number carried by an electric pulse train of the type specified, can be executed directly by delaying transmission of that train by $\theta$, $2\theta$, . . . $n\theta$. Conversely, division by 2 or any multiple of 2 included in the binary series of a number carried by such a coded pulse train, will be executed by advancing the transmission of the train by $\theta$, $2\theta$ . . . . Since such an advance is not directly realizable, at least not physically, such a division operation can be assured only in following a minor cycle, by delaying train transmission by T—$\theta$, T—$2\theta$, . . ., without considering more than the train portion included in the second minor cycle.

In such calculators, therefore, a result train is coded in binary numeration. Indication of such train configuration, moment by moment, must be read in that system of binary numeration. Generally, however, it is desirable to assure indication in decimal numeration.

It is therefore an object of this invention to provide a device which while receiving a coded train of N moments representing a number written in binary numeration, will deliver signals permitting indication of the writing in decimal numeration of that same number.

More particularly, it is an object of the invention to provide a device which while receiving at input a coded pulse train representing a number in binary numeration, will assure analysis after delivering at the repetition frequency of the minor cycles of the system, voltages pulses representing the decimal figures of said number retranslated into decimal numeration; the coded train will enter in the sense of increasing orders or weights while the translated pulses will be delivered in succession in the sense of decreasing decimal orders or weights. This will occur over output channels appropriated to the decimal numbers 0 to 9. These ten channels serve to operate the corresponding actuation input of a device indicating the decimal figures of the translated number.

A further object of the invention is to provide operation of the device in the following process.

The entering code train is first applied on comparators to compare that train, separately from but simultaneously with other coded trains representing in binary writing the comparison values $9\times10^{n-1}$, $8\times10^{n-1}$, . . ., $1\times10^{n-1}$; which will be called hereafter the comparison values; $n$ is the figure permitting to write the value $9\times10^{n-1}$ with N binary terms, hence in a minor cycle. Thereafter, that comparator is discriminated for which the comparison result indicates the highest of the comparison values below the number to be translated. Then under control of such discrimination, at one side, the output of a pulse is operated in the channel appropriated to the coefficient, 9 to 0, of that comparison value; on the other side, subtractive combination is operated of the entering code train and of the code train representing that comparison value. The code train of subtraction is then multiplied by 10 and reapplied on the input of the comparators; the above process is thereafter repeated until the $n$ decimal terms are exhausted.

In such a device, since the entering train represents an alegbraic result, and therefore its first code moment indicates the sign of the number—not its modul defined by the $N-1$ following moments—the modul of the entering pulse train is divided by 2, and thereafter the halves of the comparison values are indicated on the coded trains of the comparators, i. e. $4.5\times10^{n-1}$, $4\times10^{n-1}$, . . ., $0.5\times10^{n-1}$. Previously, the sign indication has been derived over a distinct channel. This sign has been suppressed in the above mentioned analysis operation. The channels controlling indication of decimal figures accordingly remain affected with the values 9, 8, . . . 1, 0 corresponding to the halved coefficients 4, 5, 4, . . .,0, 5, introduced into said comparison values.

These and other objects of the invention, and especially the pulse analyzer for translation into decimal writing, of a binary written number carried by an input train, will be more fully apparent from the drawings annexed herewith in which Fig. 1 represents diagrammatically an example of a part structure embodying certain features of the invention.

Figure 1:
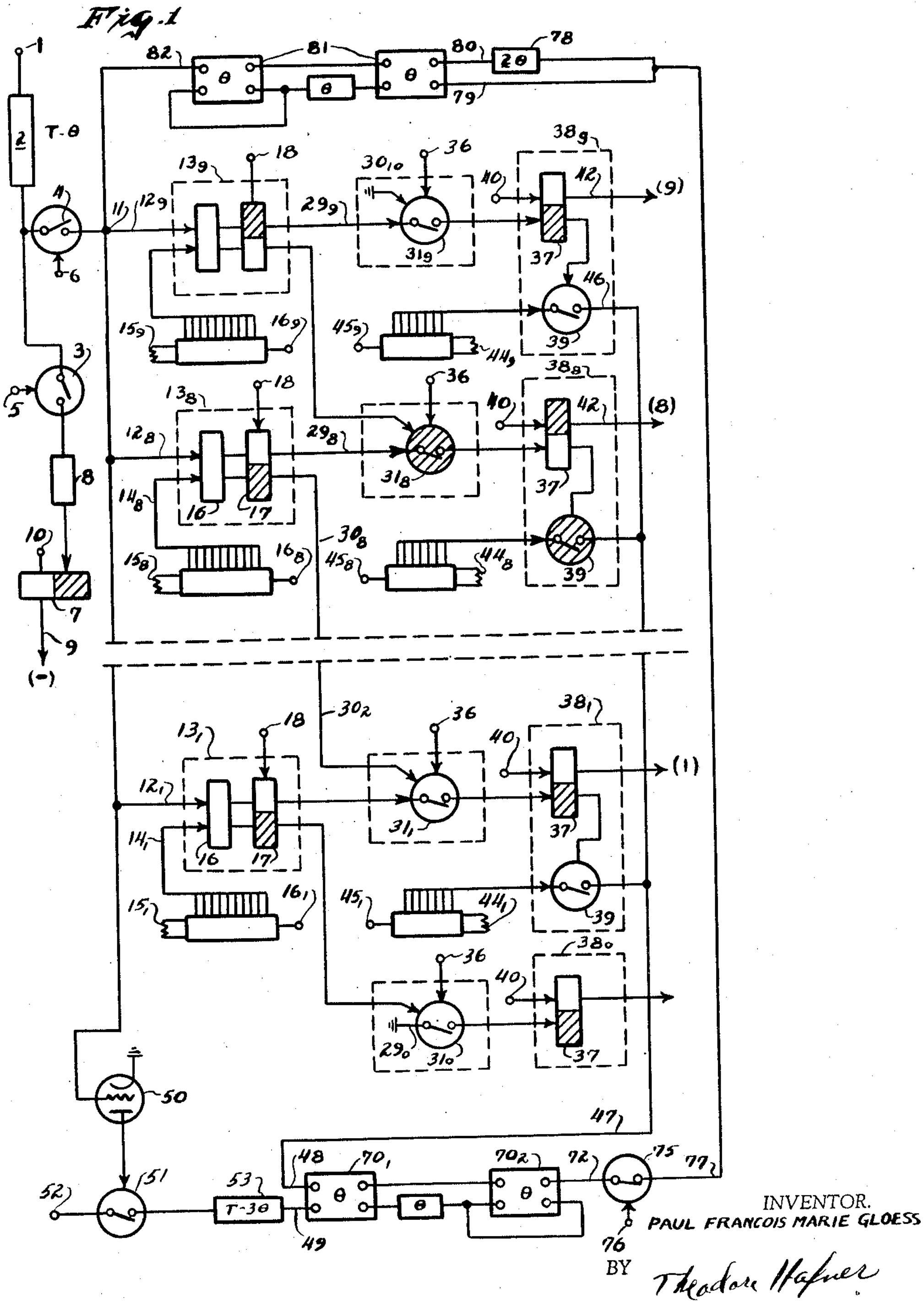
Figure 5:
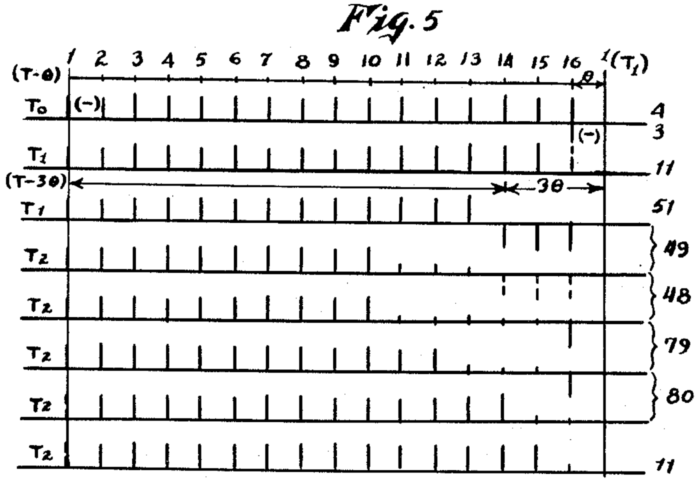
Figure 6:
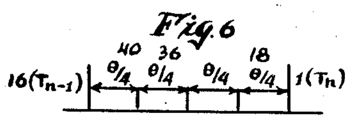

Figs. 5 and 6 diagrammatically show distribution in time of the train pulses and a program of operating the device of Fig. 1 at different points and in different minor cycles.

Figures 7, 8, 9, 10:
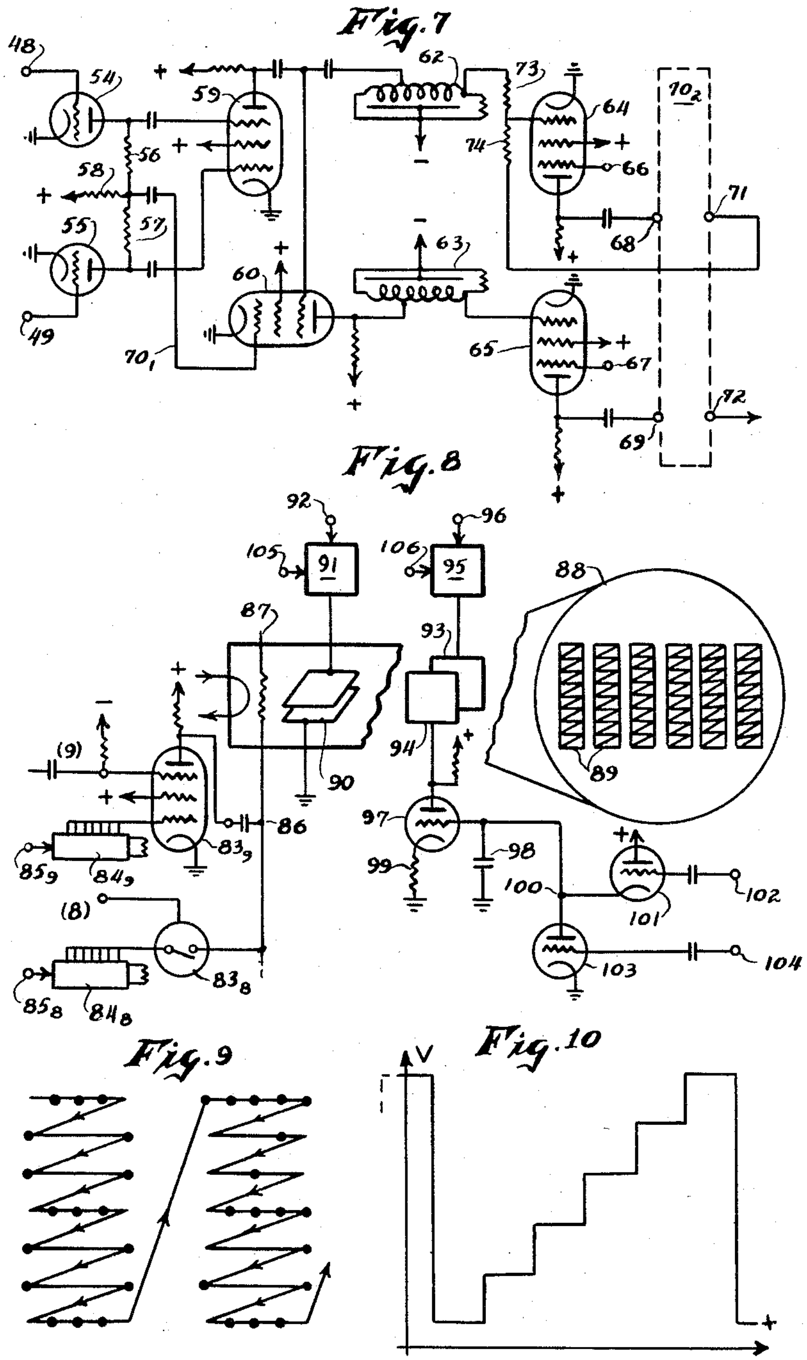

Fig. 7 shows in detail a circuit for adding two coded trains, to be inserted into the diagram of Fig. 1.

Fig. 8 represents a structure exemplifying a device for indicating the translated decimal numbers.

Fig. 9 illustrates two representatives of such numbers; and

Fig. 10 the wave form controlling deflection of the cathode tube utilized in such indicating device.

To facilitate explanation, the particular case will be considered in which the entering code train applied on terminal 1 of the analyzer, Fig. 1, is of 16 code moments, i. e. a first moment indicating the sign and 15 following moments indicating the binary figures of the maximum number transported. A code train applied, therefore, can represent any algebraic number of a modul comprised between zero and 65,534; division by 2 will reduce the maximum value to 32,768 which will compare, for decimal figure 9, with the value 45,000 (i. e. 90,000/2). This value can be written in 16 binary moments while the value 90,000 could not be so written, thus limiting reading capacity.

The input circuit of the analyzer device of Fig. 1 is actuated to assure simultaneously, separation of sign pulse and conventional division by 2 of the modul of the number transported. This is achieved by extending application terminal 1 to a delay line such as an artificial line involving an electrical delay of $T-\theta$. The output of this circuit of delayed transmission, 2, is divided into the input of two stages 3 and 4 permitting conditioned transfer or gating. The passing condition of each of these stages is defined, for example, by applying deblocking pulses on transfer controlling inputs 5, 6. The output of stage 3 controls the actuation input of a flip flop stage 7 indicating the sign with a delay 8, for example, of less than duration $\theta$ of a code moment. If actuated, output 9 of that flip flop stage delivers a voltage indicating sign (−). In order to define the rest condition of flip flop stage 7, at each minor cycle T, for example, at the Nth moment of that cycle, a zero return pulse is applied from the program distributor on actuation terminal 10 of the flip flop stage determining the sign.

The delay imparted to the complete entering code, because of its value $T-\theta$, causes in the first minor cycle $T_0$, Fig. 5, the first code moment containing the sign indication—if there is any—to be rejected at the last code moment of the minor cycle $T_0$ under consideration. Transfer or gating stage 3, through its deblocking terminal 5, is rendered conductive only at the sixteenth (Nth) moment of minor cycle $T_0$. This stage, therefore, will only transfer said sign pulse.

The last fifteen moments of the entering code, delayed by $T-\theta$, will at the output of artificial line 2, be in phase with the first fifteen moments of the following minor cycle $T_1$. Transfer stage 4, by its deblocking input 6 is rendered conducting at these first fifteen moments of minor cycle $T_1$. At the sixteenth moment, therefore, the sign pulse will be suppressed and at the same time the above mentioned division by 2 is assured by advancing in time by $\theta$ the coded pulse train representing the modul of the number.

The output of the conditioned transfer or gating stage or gate 4 is multiplied over inputs $\mathbf{12}_9$ to $\mathbf{12}_1$ of nine comparator stages designated $\mathbf{13}_9$ to $\mathbf{13}_1$. Of the latter, only the last two are represented in the diagram.

A conditioned transfer or gating stage can be realized in a simple manner by means of a three-grid tube. The signal to be transferred is applied on the control grid and the deblocking signal, in positive, is applied on the suppressor grid which without that would be carried to excessively negative polarization. Such transfer or gating stages will be found in the detail diagrams of other circuits.

If inputs 12 of comparators 13 receive in common each code train applied on terminal 11, at the output of gating stage 4, inputs $\mathbf{14}_9$ to $\mathbf{14}_1$ of these comparators will individually receive individual code trains carrying the numerical comparison values: comparator $\mathbf{13}_9$ in the illustrated example will receive a coded pulse train representing the number 45,000; comparator $\mathbf{13}_8$ will receive a coded pulse train representing the number 40,000; and so on, in values decreasing by 5,000 until comparator $\mathbf{13}_1$ will receive a coded train representing the value 5,000. These code trains are applied at each minor cycle on comparators 13, respectively, in phase with the moments of the minor cycle.

In the diagram of Fig. 1, at $\mathbf{15}_9$, $\mathbf{15}_8$, . . ., $\mathbf{15}_1$, coding elements in the form of an artificial line type receive at the first moments of each minor cycle a start pulse at inputs $\mathbf{16}_9$, $\mathbf{16}_8$, . . ., $\mathbf{16}_1$. It should be understood, however, that in a calculator system these nine coding elements can be incorporated with advantage in the primary distribution line of the system. It has also been indicated before that this primary distribution line can be used to elaborate all program pulses and, hence, all coded trains of the program for controlling the operators of the calculating system. It is sufficient, for this purpose, to provide mixers of appropriate output resistances at the equidistant taps of the primary line.

Such delay line encoders are well known and described for example in French Patents Nos. 988,021 and 1,016,970.

Each comparator contains a suppressor circuit 16. In the different channels in which the two entering trains are applied on the two actuation inputs of a bistable flip flop stage, the concomitant pulses of the compared trains are suppressed. At 18, there is indicated a terminal for applying recurrent pulses of the frequency T to return flip-flop stage 17 to zero at the instances of the sixteenth moment, indicated in Fig. 6 at 18.

Figure 2:
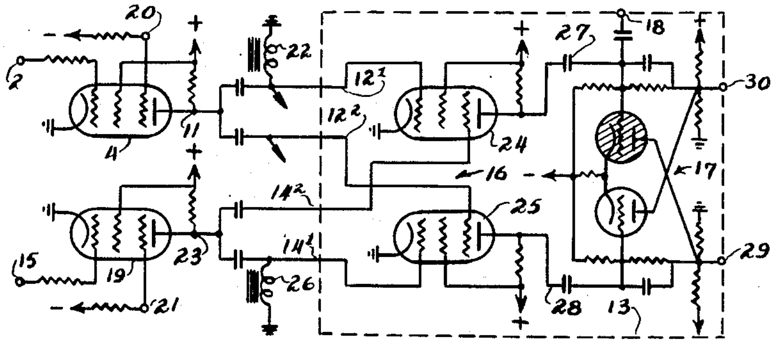
Fig. 2 represents in more detail a camparator circuit with Fig. 3 demonstrating the shapes of signals which will help in explaining the function of this circuit.

A particular example for realizing a comparator stage is represented in Fig. 2. Operation occurs over gating stage 4 which is common to all comparators, and over an output stage of artificial coding line 15. This stage serves for pulse regeneration and is located at the output of the above mentioned resistance type mixer, isolated or incorporated in the primary line.

The two stages 4 and 19 are mounted in similar fashion. Each stage consists of a three-grid tube; the control grid of stage 4 receives the entering code trains from the output of delay line 2, the control grid of gating stage 19 receives the code trains from the output of a coding element 15. The suppressor grids of these tubes are brought up to polarizing negative blocking potentials. In this way, the tubes are rendered conducting at instances only at which they receive positive deblocking pulses over terminals 20 and 21, respectively.

The pulses applied on terminal 20 of stage 4 originate from the pulse distributor of frequency $\theta$. They are taken off in phase with the $(N-1)$ first moments of each minor cycle; in the present case, therefore, in phase with the first fifteen moments of that cycle. The pulses applied on terminal 21 of stage 19 are obtained in a similar manner but they are applied at all moments of every minor cycle; in this case, therefore, at each of the 16 moments of that cycle.

Figure 3:
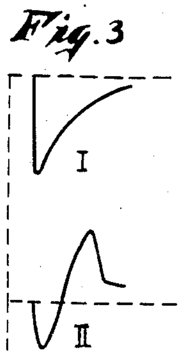

From output 11 of tube 4 two channels are derived; they are multiplied with all comparators 13 and decoupled one from the other. In one of these channels, a self inductance 22 is branched off to ground. In this way, negative pulse I, Fig. 3, is converted into a signal of configuration II, Fig. 3; and over connection $12^1$, this signal is applied on the control grid of a tube 24 of circuit 16. Signal I is applied over connection $12^2$ on the suppressor electrode of the second tube 25 of circuit 16.

Output 23 of each stage 19 is mounted in a similar manner, being divided into two channels $14^1$ and $14^2$, to operate respectively with signal II the control grid of tube 25, and with signal I the suppressor grid of tube 24. Thus, the signal of wave form I is applied on tube 24 any time signal I appears at output 23 and signal II, appearing simultaneously and shaped by grounded inductance 26, is applied on the control grid of tube 25.

In this way signal I, a large negative pulse, will block the tube over the suppressor grid on which it is applied; that tube therefore remains non-conducting for any positive wave of signal II applied on its control grid. This alternating blocking arrangement permits passage to outputs 27, 28 of tubes 24, 25, of train pulses only which for one train are not in concomitance with a pulse of the other train.

Over connection 27, the output of tube 24 operates upon an actuation input of bistable flip-flop stage 17. Over connection 28, the output of tube 25 operates upon a symmetrical actuation input of the same flip-flop stage 17. The initial rest position of that stage, before comparison, is determined by applying a rest return pulse on input 18 as stated before.

The electrical assembly of flip-flop stage 17 is conventional and need not be explained in detail.

The pulses delivered by tubes 24 and 25 are negative. They can only operate upon a tube which they reach if that tube is in conducting condition or deblocked, to render the tube non-conducting; otherwise any pulse reaching a non-conducting tube does nothing but confirm the stable condition of that tube at this instant.

Take-off 29 is derived from the plate resistance bridge of that tube of the flip-flop stage which is conducting in the rest position of that stage. Take-off 30 is derived from the plate resistance bridge of the other tube.

If at the end of a minor cycle during which comparison is automatically executed, flip-flop stage 17 is in a rest condition, the numerical quantity carried by the code train entering at 11 is inferior to the comparison value applied on the comparator by its individual input, tube 19. The last effective pulse has been applied by tube 25, either to block the—then deblocked—lower tube of flip-flop stage 27, or to confirm the condition of non-conductibility of that tube. Conversely, if flip-flop stage 17 is in work condition, at the end of minor cycle, with the lower tube conducting, then the comparison value is inferior to the numerical value of the code train applied on 11 because the last effective pulse has been furnished by that train. It should be borne in mind that the coded trains are applied with their code moments arranged in the sense of orders or weights increasing in time.

Figure 4:
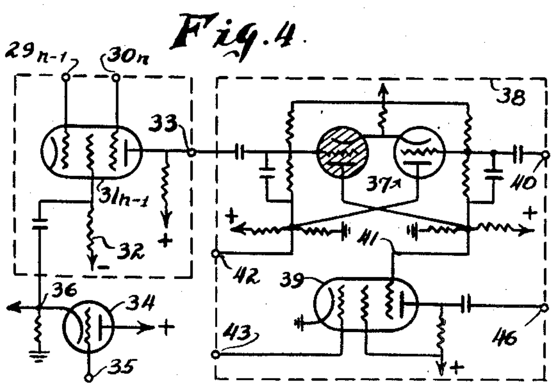
Fig. 4 shows in detail a discriminator circuit and a circuit controlling output of a pulse translating a decimal figure and controlling output of a code train to be subtrated from the input train (or from a train derived from that input train).

From output 29 of each comparator 13, a result voltage is applied on an input of stage 31. This is done in order to put the conductivity of that discriminator stage under the control of the voltage value of that output; stage 31 is conducting if the tube from the plate of which the output is taken is blocked; stage 31 is non-conducting if that tube of the flip-flop stage is conducting. As indicated for example in Fig. 4, this voltage can be applied by direct connection to the control grid of tube 31. These direct connections are indicated in the diagram of Fig. 1; each comparator output 29 operates upon the discriminator tube 31 of the same numerical index.

There is, however, an additional stage in which the control grid is always connected to ground as indicated at $29_0$.

Output 30 of each comparator 13 is connected to another input of a stage 31, but the connections are established in such a manner that the output 30 of a comparator controls the conductibility of a stage 30 of immediately inferior index. In this way, output $\mathbf{30}_9$ of comparator stage 13 is connected to an input of transfer stage $\mathbf{31}_8$, and so on with decreasing indices. The corresponding input of discriminator stage $\mathbf{31}_9$ is grounded at $\mathbf{30}_{10}$. The output voltage at 30 of each comparator stage, therefore, is connected to the suppressor grid of tube 31 of immediately inferior index, Fig. 4.

Under these conditions, each time the grid of tube 31 is positive, and the suppressor grid is equally positive, this tube will conduct unless blocked by a negative screen polarization at 32. At the end of each minor cycle, in the course of the last moment of that cycle, as indicated in Fig. 6, a deblocking pulse of positive polarity is applied on that screen; and if tube 31 is otherwise conducting, it will transmit at this instant a negative voltage over its output 33.

The pulse for screen deblocking or discriminator testing, is applied in multiple on the screen grids of the ten tubes 31. This is done from a cathodyne stage 34, Fig. 4, which receives the pulse at its control grid 35 and transmits it with the same polarity to point 36 of the multiples.

Apparently only one of the tubes 31 can be conducting at given minor cycle, at the sixteenth moment, i. e. that moment for which inputs 29 and 30 have the same polarity. In the diagram of Fig. 1, flip-flop stage 17 of comparator $\mathbf{13}_9$ has its lower tube blocked. This means that the entering code train is inferior to the comparison value $4.5\times10^{n-1}$ (here 45,000). However, tube $\mathbf{31}_9$ receives a negative voltage from the upper tube of the flip-flop stage. Tube $\mathbf{31}_9$ therefore would apply a positive voltage at its output only if a pulse deblocking the screen would be furnished to it. This positive voltage will only confirm the position of flip-flop stage 37 of the flip-flop transfer circuit $\mathbf{38}_9$ which will be discussed further below. On the other hand, at the instance of the pulse deblocking the screen, tube $\mathbf{31}_8$ will apply a negative actuation voltage on flip-flop stage 37 of its transfer circuit $\mathbf{38}_8$. This is due to the fact that tube $\mathbf{31}_8$ over connection $\mathbf{30}_9$ will receive from comparator $\mathbf{13}_9$ a positive voltage on its suppressor grid, and will also receive on its control grid a positive voltage from output $\mathbf{29}_8$ of flip-flop stage 17 of comparator $\mathbf{13}_8$. Tubes 31 of the inferior stages will not be conducting; they receive from outputs 30 of comparators $\mathbf{30}_8$ to $\mathbf{30}_1$ a negative blocking voltage on their suppressor grid.

Each output 33 of discriminator stages 31, by blocking its tube—deblocked to rest—operates upon the actuation input of flip-flop stage 37 continued in a conditioned transfer or gating stage 38 of flip-flop type. Flip-flop stage $\mathbf{37}_6$ alone, however, does not control any transfer.

The transfer tube proper 39, of circuits 38 has a suppressor grid connected to the plate of that tube of bistable flip-flop stage 37 which is conducting in the rest condition of the flip-flop stage. This rest condition is determined at each minor cycle of operation by applying rest return or rest confirmation pulse on the other actuation input 40 of flip-flop stage 37. By the voltage from that direct connection 41, tube 39 is rendered conducting only if flip-flop stage 37 is at work. This is the condition shown for circuit $38_8$ in the diagram of Fig. 1.

Furthermore, one of the plates of flip-flop stage 37, for example, the plate of the other tube serves as output 42. This output will deliver the pulse voltage or the signal indicating the corresponding decimal figures, from 9 to 0. Such indication is obtained in negative polarity each time the flip-flop stage operates, or in positive polarity each time the flip-flop stage after having been actuated, is returned to rest. In the diagram of Fig. 1, flip-flop stage $37_8$—after having been returned to or confirmed in rest condition over terminal 40 by the control pulse time defined in Fig. 6—is actuated at the end of minor cycle by the test pulse applied thereafter, at that sixteenth moment, on input 36 of discriminator $31_8$. Thus at the output (8) a positive voltage of duration T will be available to indicate this decimal figure until flip-flop stage 37 is returned to rest at the sixteenth moment of the following minor cycle.

Once the rest pulse is applied, the zero return pulse of flip-flop stage 17 of comparator $13_8$ is applied at that sixteenth moment of minor cycle. Thus the comparator will be rendered available for the minor cycle about to start and in the course of which indication will occur of the decimal result which has just been defined.

Each tube 39 is operated on its control grid 43 by a coded train derived from a coding element 44. At every first instance of minor cycle, a pulse of minor cycle is applied on input terminal 45 of coding element 44 for the production of a train that does or does not pass over common output line 47 (only one stage 39 being conducting at the end of each minor cycle and for the duration of the following minor cycle). Here, too, it should be well understood that coding elements 44 can be incorporated in the primary line of the calculator system containing the translator. In this case, the control grids of tubes 39 will receive the output signal from the coding mixers over the $\theta$-spaced outputs of the primary line.

The common line of output 47 of stages 39 is connected to an input 48 of a circuit of addition for the entering code train. This train, or more precisely, a pulse train derived from said train, entering at 11 as will be described further below, is applied on input 49 of the circuit of addition.

In the logical sequence of the operations of the analysis process referred to at the start, in effect, after having executed a first comparison, one must deduct from the entering number the comparison value immediately superior to that number. Thereafter the coded train representing the result of this subtraction, will be multiplied by 10 in order to be reapplied on input 11 for a new analysis without requiring any change in indications of comparison values at each operational cycle.

According to a classical method for electric subtraction of two quantities, the code train of that quantity from which the other should be deducted, is added to a code train representing the numerical complement of the other quantity with respect to the maximum number defined by the maximum order—hence duration $\theta$—of the trains.

In the example illustrated of trains with sixteen code moments, here under consideration, therefore coding elements $44_9$, $44_8$, . . . $44_1$ will have to deliver code trains carrying the numerical values representing the complements to 65.536 of the decimal values arranged on comparison coding elements $15_9$, $15_8$, . . . $15_1$. These complement values, therefore, will be respectively: 20.536 (65.536—45,000), 25.36 (65.536—40,000), . . . 60.536.

These numerical values can effectively be carried by the coded trains which in turn are selectively delivered at input terminal 48 of the addition circuit; the other input terminal 49 of that circuit can receive the code trains applied on 11.

In the present case, however, it should be noted that all complement values are divisible by 8. The first three code elements of these complement trains, therefore, will be without concrete pulses; the first three binary figures of weight, 1, 2 and 4 are zero. It is possible, therefore, to produce the coded trains corresponding to these "reduced" values of the complements without loss in precision; under double conditions: first, the coded trains are to be added at a value equally reduced by dividing the coded train by 8 in the course of the analysis. (As has been noted at the start, a numerical value carried by a code train is divided with respect to a time reference such as the instance of starting a minor calculator cycle, without loss in precision, directly by delaying the entire train for a complement duration; in this case $T-3\theta$). Thereafter the real value of the reduced subtraction result is reestablished by multiplying that result with 8. (As has also been noted at the start, such multiplication is directly realizable by delaying by $3\theta$ a code train carrying a reduced value.)

More precisely, the coded train applied on 11 is subtracted from the numerical value delivered over connection 47 in the minor cycle $T_2$ following the minor comparison cycle $T_1$. It is possible to operate on the reduced values by division by 8, in advancing by $3\theta$ over the start of minor cycle $T_2$ at the instance of the start of subtraction. This is possible, in the case here considered, without changing the moment at which the complement trains of coding elements 44 emerge from stages 39, starting with the first moment of minor cycle $T_2$; and this is due to the fact that the three first moments of these trains do not carry any concrete pulses and that the first significant binary figure of these trains can only be delivered at the first moment of minor cycle $T_2$.

Consequently, in the diagram of Fig. 1, the numerical values of the trains delivered by coding elements 44 are divided by 8, and the value of the code train applied on 11, is equally divided by 8. This is done by delaying that train at 53 with respect to the start of minor cycle $T_2$ by the duration $T-3\theta$, Fig. 5.

Furthermore, prior to this delay, it is also provided to limit the duration of the code train existing at 11 to its first 13 moments. This is in order to apply them on the input of addition circuit 70. In effect, the result of the first comparisons will have indicated the figure of the ten thousands of the decimal value. It is not necessary, therefore, in order to proceed with the translation operation, to conserve only those binary figures carrying now at the maximum the value of the decimal figure of the thousands. It is possible, therefore, to erase the two last moments of the train, indicating respectively 16.384 and 32.768 because the 13th moment carried value 8.192.

The same will apply to the later cycles of operation: Having obtained the decimal figure of the thousands. It will be possible to erase two moments as useless for obtaining the decimal figure of the hundreds and so on.

During minor cycle $T_1$, after polarity inversion at 50 to render the concrete pulses positive, code train 11 is directed upon a conditioned transfer or grating stage 51, for example upon a suppressor grid of such stage, causing said concrete pulses to pass. The control grid of stage 51, at 52, has applied thereon, the first thirteen distribution pulses of the minor cycle, derived from the primary line at repetition rate $\theta$ of the system. A code train, therefore, reduced to its first thirteen moments, will emerge from stage 51 as negative polarity pulses. Thereafter the numerical quantity transported thereby is divided by 8 from the addition point of view. This is done by delaying pulses $T-\theta$ in artificial delay line 53.

An example of an addition circuit for codes of two pulse trains is represented in Fig. 7 with first addition stage $70^1$ being the only stage shown in detail. The trains entering at 48 and 49 in negative polarity are first inverted in introduction tubes 54 and 55, respectively. These inverted tubes have the same plate polarization at 58 across equal resistances 56 and 57. The value of these resistances is so chosen as always to assure cooperation of pulse voltages on the individual tube plates, while also serving as mixing resistances with respect to this connection point. The plates of tubes 54 and 55 are connected, respectively, to control grids and suppressor grids of a three-grid tube 59. This tube therefore does not transmit any pulses at its output unless input pulses coexist at 48 and 49. Such pulse coexistence indicates the binary figure 2 in an additive operation of that number. As well known, according to current rules of addition in binary numeration, presence of a figure 2 must cause report of figure 1 on the term of immediately superior order, hence, in the addition of electric code trains, it must cause report of a concrete pulse on the moment following the train.

Tube 60 receives the mixture train at its control grid; it will deliver pulses at all code moments at which there exist concrete pulses in one or the other of the entering trains, or in both. The suppressor grid of tube 60, over connection 61, is always connected to the output plate of tube 59. As a result—output pulses from 59 being of negative polarity—tube 60 is rendered non-conducting each time there exist concrete pulses in the two trains.

The output of tube 60, therefore, will deliver pulses only if there exists a concrete pulse in only one of the trains, at a predetermined code moment.

The outputs of tubes 59 and 60 are directed, respectively, toward delay lines 62 and 63. Delay line 62 has an electric length of $2\theta$; delay line 63 an electric length of $\theta$. These lines are short circuited at one end and operate, respectively, with their opposite ends on the control grids of two conditioned transfer or gating stages 64 and 65. These two stages—normally non-conducting—are deblocked in the rhythm of the coded trains. For this purpose, a recurrent sequence of positive pulses of frequency $\theta$—derived as always from the primary line of the calculator—is applied over terminals 66 and 67, respectively, to the suppressor grids of stages 64 and 65.

Each negative pulse entering upon one of the lines, due to the presence of the short circuits, will be converted into signals of double polarity, with a positive wave following a negative wave; the positive wave arrives in phase with the deblocking pulse for tube 64 or 65 operating thereupon. This tube then delivers a regenerated, i. e. clean shaped negative pulse.

Output terminals 68 and 69 of that first circuit, or semi-adder, operate on the two inputs of a second circuit, 70², identical with the first one in all points except in that its line 62 has a travel duration of only $\theta$, instead of $2\theta$. Its output terminal 71, equivalent to terminal 68 of the first circuit, is taken back to the control grid of tube 64. Resistances 73 and 74 assure input mixing on that tube, of pulses reporting from first and second circuits, while simultaneously assuring separation of the circuits. Output terminal 72 of the second circuit operates on the channel for deriving the coded train of addition. The entire structure functions in accordance with the well known technique for operating adders comprising two semi-additioners in cascade. There is no need, therefore, to repeat such technique in detail.

It will be noted that with the indicated arrangement, the total delay between input and output terminals of adder 70 amounts to $2\theta$. The addition train, therefore, emerging from such operation is already multiplied by the numerical value 4, taking into consideration its position of assembly in the minor cycle.

Output 72 of adder 70 passes over transfer stage 75 which receives at terminal 76 a blocking pulse at the 13th code moment. This blocking pulse, therefore, suppresses the parasitic report delivered by the additioner at that instant. The report is parasitic; it only emerges because the code train had been previously limited to its first thirteen moments and, if it existed, it would have to be reported on an order term which had been suppressed for the above mentioned reasons.

Output connection 77 of transfer stage 75—a three grid tube normally conducting and blocked by a negative voltage pulse on its screen grid at the thirteenth code moment—is then divided into two channels to multiply with the numerical value of 10 the number carried by the code train received thereon. Such multiplication is assured, by way of example, by adding the direct train to that same train delayed by $2\theta$ at 78, i. e. by adding a second train of a numerical value multiplied by Figure 4; this addition, therefore, results in a coded pulse train transporting a numerical value which is 5 times that of the entering train, and which like the remainder operator 81—which fulfills this function—receives at inputs 79 and 80, the two—direct and retarded—code trains; the transmission delay is $2\theta$, being chosen identical with remainder operator or adder 70 described above. It assures first complementary multiplication by 2 of that quintupled result; hence, total multiplication by 10 as desired; this is done by a delay $\theta$ in its first circuit. It further assures, in its second circuit, a new multiplication by 2 which completes the multiplication by 4 established by delay $2\theta$ of adder 70. In this way it assures that in output channel 82 of second adder 81, a code train of numerical pulses is reestablished, carrying the result multiplied by 80 of the subtraction result of the reduced values; the latter values having been applied by code trains 48 and 49 on the input of the reinjection channel.

Out put 82 is connected to multiple point 11; the coded train delivered thereat is in phase with the moments of minor cycle $T_2$ and the simultaneous comparison procedure for obtaining the second decimal figure is directly assured; and all these operations continue in the analyzer just described in a ring type sequence, in $n$ minor cycles; in the example under consideration, $n$ is 5; the retranslated decimal figure cannot exceed 65,534.

The decimal number thus translated, therefore, is defined by time successive appearance of output voltages on wires (−) and (9 to 0). In order to indicate this decimal number by suitable registration, the numbers represented by these voltages are caused to appear upon an oscilloscope screen and statically photographed. Such an assembly is often called numeroscope or numerograph. In connection with the arrangements above described, the assembly can be established to conform with the diagram given in Fig. 8.

In this diagram, output wires (9), (8), . . . of the translating analyzer operate after polarity inversion (not shown) upon the suppressor grids of three-grid tubes $83_9$, $83_8$, . . . in each minor cycle of analysis; therefore, only one of these tubes is deblocked. At each minor cycle, the control grids of each of these tubes receive from a coding element 84 a signal representing the numerical figure corresponding to its rank; an additional tube receives code (−). These signals are produced by applying periodically at frequency T a test pulse, and the code lasts the same time T. The rhythm of these pulses, however, is not tied anymore to the rhythm of the binary train moments previously considered in the calculator; it is now tied to the rhythm for exploring the screen of cathode ray tube 88 indicating the figures.

Tube 88, in effect, receives through common output connection 86 of tubes 83, the code deciphering signals at its control grid or Wehnelt electrode 85. Its cathode beam therefore is modulated in intensity by these code signals; the illumination of the spot on the tube screen is assured only at the instances there exist concrete pulses in these codes.

The scanning of the screen is assured for example by two pairs of deviation plates 90 for horizontal deviation and 93, 94 for vertical deviation. Plate pair 90 receives the periodic vertical deviation signal from a generator circuit producing a stepped relaxation voltage of the formed indicated in Fig. 10 where V indicates the voltage applied and $t$ the time of application. This signal has a total duration of T and each voltage step represents the vertical amplitude of exploration between two consecutive lines of the path. The vertical deviation voltage presents for example seven steps or blocks of voltage of individual duration T/7.

This voltage is furnished by a generator 91 synchronized or controlled from terminal 92.

Horizontal scanning is controlled by applying, for example, on plate 93 a voltage of the same stepped configuration, for example, of 5 steps or blocks, cyclically varying at frequency $T/a$, for example T/7. This would mean, in an example illustrating the invention, 7 lines of 5 points per figure picture.

At frequency NT, meanwhile, horizontal deviation plate 95 receives a stepped voltage—always of the same configuration—with the stepped duration T. In the present case, there are 6 steps in this voltage. Due to this additional application, the scanning path of a figure picture is progressively displaced, as indicated in Fig. 8 at 89, and as visible more clearly from the details of the enlarged picture in Fig. 9.

An example of a generator circuit for such stepped voltages, is schematically represented in Fig. 8 for the last of the voltages of the scanning referred to. Approximately with the same control times, this structure could also be utilized to realize scanning control circuits 91 and 94.

This circuit, therefore, is in fact an integrating counter. Deflecting plate 94 is tied to the plate of a tube 97. The grid input connection of tube 97 contains a grounded capacity 98, and its cathode connection a grounded resistance 99. Input point 100 of the grid circuit is simultaneously tied to the plate of tube 103 and to the cathode of tube 101. Each of these tubes is operated upon at its control grid 104 and 102, respectively.

Condenser 98 is charged periodically over terminal 104 with pulses of frequency T and in phase with the minor cycles of the calculator. At each minor cycle, therefore, the condenser acquires a new charge. This results into a permanent deviation of the cathode beam, and, therefore, at each minor cycle, into a progressive deviation of the path of a figure picture on the screen of oscilloscope 88. At all the $n$T's, in this case all the 6 T's, a pulse is applied on terminal 102. This renders tube 101 conducting which in turn serves directly to discharge capacity 98, as the cathode beam returns to its first picture position.

In a like structure of circuit 91, terminal 92 will receive a discharge pulse at all instances from the start of minor cycle. It will also receive a pulse from terminal 105 at all instances T/7. In a like structure of circuit 95, terminal 96 will receive a discharge pulse all the T/7's; terminal 106 will receive a discharge pulse all the T/35's.

Such an indicator of the oscilloscope or oscillograph type, therefore, is simple enough to be associated effectively with an analyzer device such as described in the preceding figures.

It is quite clear that numerous detailed modifications can be applied to the arrangements described without exceeding the scope of the invention. The latter is in no way limited to the example illustrated, such as a code train of 16 code moments transporting an algebraic number, nor to sign indication represented by presence or absence of a concrete pulse in the first code element of this train.

I claim:

1. In a system for analyzing coded trains of electric pulses of maximum duration not more than equal to the duration of a minor cycle of the system; the N moments of equal duration defining the greatest number $2^{n-1}$ representable by a train to be analyzed, and the decimal value $9\times10^{n-1}$ defining the highest value to be written in said N moments, first input means receiving a code train to be analyzed and a number of second input means for receiving a number of other coded pulse trains individually, carrying respectively nine predetermined numerical values, $9\times10^{n-1}$, $8\times10^{n-1}$, $3\times\ldots$, $1\times10^{n-1}$, nine circuits for comparing code train configurations having first inputs connected in common to said first input means and second inputs connected to said second input means, and having outputs for indicating the numerical relation between the numerical value of said first input code train, and said predetermined numerical values, ten discriminator circuits, the first and last discriminators being controlled by first and last comparators and a reference voltage respectively, while intermediate discriminators are controlled each by pairs of comparators of equal and succeeding higher rank respectively, the first and last discriminators being adapted to be operated by those comparators only that receive the largest and smallest numerical values, respectively; a number of means under control of discriminator circuits corresponding to numerical values immediately above and below the numerical value of said input code train for indicating the decimal figures; means for producing pulse trains representing values complementary to $2^{n-1}$ of said numerical values, a number of gating stages having separate input means for receiving at each minor cycle a coded pulse train representing one of the values complementary to $2^{n-1}$ of said numerical values; and having common output means; the nine indicating means of higest rank also controlling each one of said gating stages; means including further delay means for receiving the code train derived from said commoned first comparator inputs; means operated by said common output means and said delay means for adding the delayed input train and said complementary numerical values at each minor cycle, a circuit for multiplying by 10 the numerical value of said added values, and means for feeding back into said commoned first comparator inputs, the output code train from said multiplying circuit.

2. In a device according to claim 1 wherein said first input means include delay means of electric length of $T-\theta$, $\theta$ standing for the duration of a pulse period; and $N\theta$ for the duration of a coded result train with N pulse periods; N defining the numerical output capacity of the calculator, a gating stage having an input connected to said delay means and an otutput connected to said commoned comparator inputs, means for maintaining said gating stage in conducting condition only during pulse periods from 0 to $N-1$; and a sign indicating device under control of the last pulse period, also connected to said delay means.

3. In a device according to claim 2 wherein said delay means is coupled to said sign indicating device over another delay means corresponding to a delay equal to duration $\theta$ of a minor cycle, the coupling including another gating stage suppressing those pulse trains which in the sequence of the pulse periods represent the numbers of decimal weight $(n-1)$; and wherein said indicating means include further flip-flop stages indicating the decimal figures from 9 to 1, said flip-flop stages being caused to omit said latter pulse periods.

4. Device according to claim 1 wherein the numerical values of the comparator circuits are adapted to be equal to $4.5\times10^{n-1}$; $4\times10^{n-1}$; $\ldots$ $0.5\times10^{n-1}$.

5. Device according to claim 1 wherein said further delay-means correspond to a delay equal to duration T of a minor cycle less a predetermined number of code moments so selected as to permit division of said complementary values without loss in definition of the numbers carried by the trains received on the inputs of said further gating stages.

6. Device according to claim 5 comprising additional delay means for said same delay connected between said adder and said commoned first comparator inputs.

7. Device according to claim 1 wherein each comparator includes a flip-flop stage and a suppressor circuit under control of coincidence of the pulses received of the two trains; having outputs applied separately on the two actuation inputs of the comparator flip-flop stage, and means for returning said flip-flop stage to a defined condition at each last pulse period of minor cycle.

8. Device according to claim 1 wherein each comparator includes a flip-flop stage and each discriminator includes a three-grid tube receiving at one grid the output voltage of the comparator flip-flop stage of the same rank; at another grid the output voltage of the comparator stage of numerically higher rank; and at a third grid a test pulse at each last moment of minor cycle prior to the zero return pulse of the comparator flip-flop stages; and wherein said indicating means include further flip-flop stages the output of each discriminator operating upon one input of one of the further flip-flop stages, the other input of which receives a zero return pulse at each last moment of minor cycle, and means for applying said test pulse at said last minor cycle moment.

9. Device according to claim 1 wherein each comparator includes a flip-flop stage and each discriminator includes a three-grid tube receiving at the control grid the output voltage of the comparator flip-flop stage of the same rank; at a suppressor grid the output voltage of the comparator stage of numerically higher rank; and at a screen grid a test pulse of the comparator flip-flop stages and wherein said indicating means includes further flip-flop stages, the output of each discriminator operating upon one input of one of the further flip-flop stages, the other input of which receives a zero return pulse at each last moment of minor cycle, and means for applying said test pulse at said last minor cycle moment.

10. Device according to claim 1 wherein each comparator includes a flip-flop stage and each discriminator includes a three-grid tube receiving at the control grid the output voltage of the comparator flip-flop stage of the same rank; at a suppressor grid the output voltage of the comparator stage of numerically higher rank; and at a screen grid a test pulse at each last moment of minor cycle prior to the zero return pulse of the comparator flip-flop stages; and wherein said indicating means include further flip-flop stages, the output of each discriminator operating upon one input of one of the further flip-flop stages, the other input of which receives a zero return pulse at each last moment of minor cycle, and means for applying said test pulse at said last minor cycle moment.

11. Device according to claim 1 comprising a 10-multiplying circuit including an adder receiving the direct code train at one of its inputs and including delay means applying the same train delayed by two pulse periods, at its other input; an additional delay means corresponding to two pulse periods being provided in said circuit.

12. Device according to claim 11 wherein at least part of said additional delay means is provided in the input of said circuit.

13. Device according to claim 11 wherein at least part of said additional delay means is provided in the output of said circuit.

14. In a device according to claim 1 wherein said indicating means include ten flip-flop stages for indicating the decimal figures and flip-flop stage for the sign having outputs connected to the deblocking electrodes of an equal number of gating stages, a cathode ray oscilloscope having a control electrode coupled to said gating stages and having a screen for marking figures and signs respectively, and scanning means under control of saw tooth voltages at each minor cycle for defining successively displaced deflection paths including circuit means for causing the local displacement of such paths to occur cyclically and at a repetition rate of the highest decimal order of the numbers to be translated.

15. In a device for translating a coded pulse train representing a number in binary numeration into a number of decimal numeration, said coded train being of maximum duration not more than equal to the duration of a minor cycle of the system; the N pulse periods of equal duration defining the greatest number $2^{n-1}$ representable by a train to be translated and the decimal value $9\cdot10^{n-1}$ defining the highest value to be written in said pulse periods, first means for receiving a coded pulse train to be translated, second means for receiving coded pulse trains separately representing nine predetermined numerical values, $9\times10^{n-1}$, $8\times10^{n-1}$, $3\times\ldots$, $1\times10^{n-1}$, respectively, nine circuits for comparing code train configurations having first and second input means connected to said first and second receiving means; a bistable flip-flop stage in each comparator circuit to indicate the numerical relationship between the numerical values of said first and second trains, discriminator circuits, the first and last ones being arranged under control of those comparator flip-flop stages only that receive the largest and smallest numerical values respectively, and the intermediate ones being arranged under control of pairs of comparator flip-flop stages of each rank and the next higher rank, and other bistable flip-flop stages arranged under control of said discriminator circuits to indicate the decimal figure corresponding to the pairs of numerical values immediately above and below the numerical value of said first coded pulse train.

16. Device according to claim 15 comprising a number of gating stages, nine of said other flip-flop stages of highest rank also controlling each a gating stage, means for converting said predetermined numerical values into values complementary to $2^{n-1}$ of said predetermined values, said gating stages at their inputs receiving each at each minor cycle a coded pulse train representing one of said complementary values; common output means for said gating stages, means including delay means for receiving coded pulse train from said first receiving means, means operated by said common output means and said delay means for adding the value of said delayed first coded pulse train and one of said complementary values, means for multiplying by 10 the numerical value of said added values, and means for feeding back to said first comparator inputs the output code train from said multiplying means.

17. Device according to claim 16 comprising a delay line in said second receiving means of electrical length substantially equal to duration T of a minor cycle less a predetermined number of pulse periods.

18. Device according to claim 17 comprising an additional delay line for said same delay in said feed back means.

19. Device according to claim 16 wherein said multiplying circuit consists of an adder receiving the direct code train at one of its inputs and including delay means for applying the same train delayed by two pulse periods, at its other input; said adder including means for producing an additional delay by two pulse periods.

20. Device according to claim 16 wherein said multiplying means consists of an adder receiving the direct code train at one of its inputs, and including delay means for applying the same train delayed by two pulse periods at its other input; said adder including means for producing an additional delay by two pulse periods at its input.

21. Device according to claim 16 wherein said multiplying means consists of an adder receiving the direct code train at one of its inputs and including delay means for applying the same train delayed by two pulse periods, at its other input; said adder including means for producing an additional delay by one pulse period at its input and means for producing another delay by one pulse period at its output.

22. Device according to claim 15 comprising a delay line of electric length of $T-\theta$ in said first receiving means $\theta$ standing for the duration of a pulse period; and $N\theta$ for the duration of a coded result train with N pulse periods; N defining the numerical output capacity of the calculator, and a gating stage coupling said receiving means to said first comparator inputs, another gating stage and another delay line of electrical length of not more than $\theta$; and sign indicating means, said other gating stage being in conducting condition during the last pulse period and said sign indicating means being coupled to said first receiving means through said gating stage and said other delay line, said gating stage being in conducting condition only during pulse periods from 0 to $N-1$.

23. In a device according to claim 22 wherein said ten flip-flop stages for indicating the decimal figures and the flip-flop stage for the sign have their outputs connected to the deblocking electrodes of an equal number of gating stages; a cathode ray oscilloscope having a control electrode coupled to said gating stages and having a screen for marking figures and sign respectively, and scanning means under control of saw tooth voltages at each minor cycle for defining successively displaced deflection paths, including circuit means for causing the local displacement of such paths to occur cyclically and at a repetition rate of the highes decimal order of the numbers to be translated.

24. Device according to claim 15 comprising means for receiving pulse train from said first receiving means including a delay line of electrical length not more than equal to duration T of a minor cycle and a gating stage for suppressing those pulse trains which in the sequence of the pulse periods represent the numbers of decimal weight $(n-1)$.

25. Device according to claim 15 wherein each comparator includes a suppressor circuit under control of coincidence of the pulses received of the two trains having outputs applied separately on the two actuation inputs of said bistable comparator flip-flop stages, and means for returning said flip-flop stages to a defined condition at each last pulse period of the minor cycle.

26. Device according to claim 25 wherein each comparator includes a flip-flop stage and each discriminator contains a three-grid tube receiving at one grid the output voltage of the comparator flip-flop stage of the same rank; at another grid the output voltage of the comparator stage of numerically higher rank; and at a third grid a test pulse at each last period of minor cycle prior to the zero return pulse of the comparator flip-flop stages; and wherein said indicating means include a number of further flip-flop stages, the output of each discriminator operating upon one input of one of said indicator stages, the other input of which receives a zero return pulse at each last period of minor cycle prior to the application of the test pulse on the discriminator circuits, and means for applying said test pulse at said last minor cycle period.

27. Device according to claim 25 wherein each comparator includes a flip-flop stage and each discriminator contains a three-grid tube receiving; at one control grid the output voltage of the comparator flip-flop stage of the same rank; at a suppressor grid the output voltage of the comparator stage of numerically higher rank; and at a screen grid a test pulse at each last period of minor cycle to the zero return pulse of the comparator flip-flop stages; and wherein said indicating means include a number of flip-flop stages, the output of each discriminator operating upon one input of one of said further flip-flop stages, the other input of which receives a zero return pulse at each last period of minor cycle prior to the application of the test pulse on the discriminator circuits, and means for applying said test pulse at said last minor cycle period.

28. In a device for analyzing coded trains of electric pulses, first input means for receiving a code train to be analyzed and a number of second input means for receiving a number of other coded pulse trains individually carrying respectively nine predetermined numerical values, $9\times10^{n-1}$; $8\times10^{n-1}$; $3\times\ldots$; $1\times10^{n-1}$; nine circuits for comparing code train configurations having first inputs connected in common to said first input means, and second inputs connected to said second input means and having outputs for indicating the numerical relation between the numerical value of said first input code train and said predetermined numerical values; ten discriminator circuits, the first and last discriminators being controlled by first and last comparators, and a reference voltage respectively, while intermediate discriminators are controlled each by pairs of comparators of equal and succeeding higher rank respectively, the first and last discriminators adapted to be operated by those comparators only that receive the largest and smallest numerical values, respectively; a number of means under control of said discriminator circuits for indicating the decimal figures; means for producing pulse trains representing values complementary to $2^{n-1}$ of said numerical values, a number of gating stages having separate input means for receiving a coded pulse train representing one of the values complementary to $2^{n-1}$ of said numerical values; and having common output means; the nine indicating means of highest rank also controlling each one of said gating stages; means including delay means for receiving the code train derived from said commoned first comparator inputs; means operated by said common output means and said delay means for adding the numerical value of the delayed input train and said complementary numerical values, a circuit for multiplying by 10 the numerical value of said added values, and means for feeding back into said commoned first comparator inputs, the output code train from said multiplying circuit.

29. In a device for analyzing coded trains of electric pulses, first input means for receiving a code train representing a binary value to be analyzed and a number of second input means for receiving a number of other coded pulse trains representing respectively nine predetermined decimal values, $9\times10^{n-1}$; $8\times10^{n-1}$; $3\times\ldots$; $1\times10^{n-1}$; means for comparing code train configurations having first inputs connected in common to said first input means, and second inputs connected to said second input means and having outputs for indicating the numerical relation between the numerical value of said first input code train and said predetermined numerical values; means for discriminating between pairs of outputs of each rank and its next higher rank; the first and last comparator outputs being paired with a reference voltage respectively, means under control of discriminating means corresponding to numerical values ranking immediately above and below the numerical value of said input code train for indicating the decimal figures; means for producing pulse trains representing values complementary to $2^{n-1}$ of said numerical values, gating means under control of said indicating means corresponding to decimal figures 9 to 1, having separate input means for receiving a coded pulse train representing the values complementary to $2^{n-1}$ of said numerical values, and having common output means, said gating means including delay means for receiving the code train derived from said commoned first comparator inputs; means operated by said common output means and said delay means for adding the numerical value of the delayed input train and one of said complementary numerical values, means for multiplying by 10 the numerical value of said added values, and means for feeding back into said commoned first comparator inputs, the output code train from said multiplying means.

30. In a device for analyzing coded trains of electric pulses, first input means for receiving a code train representing a binary value to be analyzed and a number of second input means for receiving a number of other coded pulse trains representing respectively nine predetermined decimal values; means for comparing code train configurations having first inputs connected in common to said first input means, and second inputs connected to said second input means and having outputs for indicating the numerical relation between the numerical value of said first input code train and said predetermined numerical values; means for discriminating between pairs of outputs of each rank and its next higher rank the first and last comparator outputs being paired with a reference voltage respectively, and means under control of discriminating means corresponding to numerical values ranking immediately above and below the numerical value of said input code train for indicating the decimal figures.

31. In a device according to claim 30 comprising means for producing pulse trains representing values complementary to $2^{n-1}$ of said numerical values and gating means under control of said indicating means corresponding to decimal figures 9 to 1, having separate input means for receiving a coded pulse train representing the values complementary to $2^{n-1}$ of said numerical values, and having common output means, said gating means including delay means for receiving the code train derived from said commoned first comparator inputs; means operated by said common output means and said delay means for adding the numerical value of the delayed input train and one of said complementary numerical values, means for multiplying by 10 the numerical value of said added values, and means for feeding back into said commoned first comparator inputs, the output code train from said multiplying means.

References Cited in the file of this patent

UNITED STATES PATENTS

| | | |
|---|---|---|
| 2,444,042 | Hartley | June 29, 1948 |
| 2,570,716 | Rochester | Oct. 9, 1951 |
| 2,576,099 | Bray | Nov. 27, 1951 |
| 2,657,856 | Edwards | Nov. 3, 1953 |

OTHER REFERENCES

"Conversion Between Binary and Decimal Number Systems," pages 25–1 to 25–8, 8 pages. Lecture 25 by Dr. John W. Mauchly, in "Theory and Techniques for Design of Electronic Digital Computer," Univ. of Pa., June 30, 1948.